UNITED STATES PATENT OFFICE 2,478,049

2-n-BUTYLPYRIMIDINE HOMOLOGUE OF THIAMINE

Randolph T. Major, Mountainside, and Karl Folkers, Plainfield, N. J., Oscar H. Johnson, Medina, N. Y., and Philip L. Southwick, Pittsburgh, Pa., assignors to Merck & Co., Inc., Rahway, N. J., a corporation of New Jersey No Drawing. Application November 5, 1946, Serial No. 707,972

5 Claims. (Cl. 260—251)

This invention is concerned with novel quaternary thiazolium salts having anti-vitamin activity; more particularly it relates to 4-methyl-5-$\beta$-hydroxyethyl-N-([2-n-butyl-4-amino-pyrimidyl-(5)]-methyl)-thiazolium halides and hydrogen halide salts thereof.

These new compounds function as thiamine inhibitors and are useful for reducing the thiamine level in the body. They are also useful in the investigation of vitamin function and in the elucidation of the mechanism of life processes. They are further useful as growth-depressing agents.

The 4-methyl-5-$\beta$-hydroxyethyl-N-{[2-n-butyl-4-amino-pyrimidyl-(5)]-methyl}-thiazolium monohalides and halide hydrohalides, subject of this application, can be represented respectively by the following structural formulae:

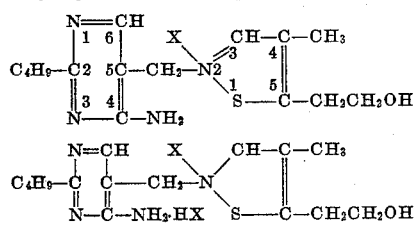

wherein X is a halogen radical and HX is a hydrogen halide.

These compounds are similar to vitamin $B_1$, (thiaminchloride hydrochloride) which can be represented by the following structural formula:

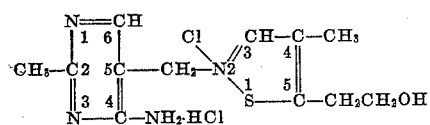

except that the methyl radical in the 2-position of the pyrimidine nucleus of vitamin $B_1$ is replaced by an n-butyl grouping.

Compounds in which the 2-methyl radical of the pyrimidine nucleus is replaced by a 2-ethyl radical, a 2-n-propyl radical or a 2-isopropyl radical, have been prepared previously, [Schultz, Zeit fur Physiol. Chem. 265, 113 (1940)], but all of these compounds show biological activity similar to vitamin $B_1$. For example, Stein et al. (J. A. C. S. 63, 2054 (1941)) demonstrated that the 2-ethyl pyrimidine analog of vitamin $B_1$, (i. e. 4-methyl-5-$\beta$-hydroxyethyl-N-{[2-ethyl-4-amino-pyrimidyl-(5)]-methyl}-thiazolium chloride hydrochloride) can be used in place of thiamine to supply the vitamin $B_1$ requirement in nutrition.

In view of the fact that it was generally considered that vitamin $B_1$-active compounds are obtained irrespective of the hydrocarbon radical attached at the 2-position of the pyrimidine nucleus, it is surprising that applicants' 2-n-butylpyrimidine analogue, does not show vitamin $B_1$ activity but instead functions as an anti-vitamin.

The 4-methyl-5-$\beta$-hydroxyethyl-N-{[2-n-butyl-4-amino-pyrimidyl-(5)]-methyl}-thiazolium salts, subject of this application, can be prepared as follows: n-valeramidine hydrochloride is reacted with the sodium salt of ethyl $\alpha$-formyl-$\beta$-ethoxy-propionate to produce 2-n-butyl-4-hydroxy-5-ethoxymethylpyrimidine, which is reacted with phosphorous oxychloride whereby the 4-hydroxy grouping is replaced by a 5-chloro radical and the resulting compound is heated with alcoholic ammonia to form 2-n-butyl-4-amino-5-ethoxymethyl-pyrimidine. This compound is then reacted with a glacial acetic acid solution of hydrogen bromide to form 2-n-butyl-4-amino-5-bromomethyl-pyrimidine hydrobromide which is heated with 4-methyl-5-$\beta$-hydroxyethyl-thiazole to produce 4-methyl-5-$\beta$-hydroxyethyl-N-{[2-n-butyl-4-amino-pyrimidyl-(5)]-methyl}-thiazolium bromide hydrobromide. This compound is converted to other halide hydrohalides by metathesis employing the appropriate halide. The various halide hydrohalides can be converted to the corresponding monohalide by reaction with an aqueous solution containing one stoichiometric equivalent of sodium bicarbonate.

The following example illustrates a method of carrying out the present invention, but it is to be understood that this example is given by way of illustration and not of limitation.

EXAMPLE

*Preparation of 2-n-butyl-4-hydroxy-5-ethoxymethyl-pyrimidine*

270 grams of the sodium salt of ethyl $\alpha$-formyl-$\beta$-ethoxypropionate were dissolved in 210 cc. of water cooled to 0° C. After the salt had completely dissolved, the solution was cooled to —1° C. and 270 g. of n-valeramidine hydrochloride were added. The mixture was stirred for 15 minutes, and a solution of 54 g. of sodium hydroxide in 95 cc. water was added, after which the mixture was stirred for 24 hours in an ice bath. The mixture was then allowed to warm to room temperature and was diluted with water to a volume of approximately 1 liter. Glacial acetic acid was added until the solution become slightly acid whereupon precipitation occurred and the mixture was then cooled in an ice bath and stirred until precipitation was complete. The product was removed by filtration, washed with water on the filter and dried in a vacuum desiccator. The light brown, sticky, crude product weighed 229 g. Purification was accomplished by repeated extraction of the crude product with boiling water. From the aqueous extracts 43.7 g. of white 2-n-butyl-4-hydroxy-5-ethoxymethyl-pyrimidine, M. P. 110–114° C. crystallized on cooling. An analytical sample, recrystallized from water, melted at 116.5–118° C., Anal. Calcd. for: $C_{11}H_{18}O_2N_2$: C, 62.83; H, 8.63. Found: C, 62.41, 62.36; H, 8.48, 8.77.

*Preparation of 2-n-butyl-4-chloro-5-ethoxymethyl-pyrimidine*

To 23.8 g. of 2-butyl-4-hydroxy-5-ethoxymethylpyrimidine was added 26 ml. of phosphorous oxychloride. When most of the pyrimidine had dissolved, the mixture was heated on a water bath under a reflux condenser, and sufficient chloroform was added to lower the temperature of the refluxing solution to 78° C. Heating was continued for six hours. The reaction mixture was poured onto ice and stirred vigorously. More ice was added while the mixture was neutralized and made slightly alkaline with 28% aqueous ammonia. The layers were separated, and the aqueous layer was extracted four times with chloroform. The chloroform extracts were combined with the original organic layer, and the solution was dried over sodium sulfate, and then concentrated under reduced pressure. The crude 2-n-butyl-4-chloro-5-ethoxymethyl-pyrimidine which was obtained as a brown oil, weighed 24.3 g.

*Preparation of 2-n-butyl-4-amino-5-ethoxymethyl-pyrimidine*

A solution of 24.3 g. of crude 2-n-butyl-4-chloro-5-ethoxy-methylpyrimidine in 210 ml. of 10% alcoholic ammonia was heated in a bomb for six hours at 120° C. The solution was then concentrated under reduced pressure and the residue was extracted three times with 250 ml. portions of boiling ether. The combined ether extracts were filtered and allowed to evaporate to leave 14.7 g. of a yellow oil which crystallized slowly at room temperature, or more rapidly when cooled. An analytical sample of 2-(n-butyl)-4-amino-5-ethoxymethyl-pyrimidine was prepared by repeated sublimation of said oil at a pressure of 0.5 mm.: M. P. 48–51° C.; Anal. Calcd. for: $C_{11}H_{19}ON_3$: C, 63.11; H, 9.16. Found: C, 63.44; H, 8.89.

The hydrochloride was prepared by passing a stream of dry hydrogen chloride over an ethereal solution of the 2-(n-butyl)-4-amino-5-ethoxymethyl-pyrimidine The white precipitate was crystallized from a mixture of acetone and ether to give needles of 2-n-butyl-4-amino-5-ethoxymethyl-pyrimidine hydrochloride M. P. 136.5–137.5°; Anal. Calcd. for: $C_{11}H_{20}ON_3Cl$: C, 53.74; H, 8.20; N, 17.11. Found: C, 53.90; H, 8.41; N, 16.88.

*Preparation of 2-n-butyl-4-amino-5-bromomethyl-pyrimidine hydrobromide*

2-n-butyl-4-amino-5-ethoxymethyl-pyrimidine (15.2 g.) was dissolved in 260 ml. of a 12% solution of hydrogen bromide in glacial acetic acid. The mixture was kept at a temperature of 80° C. for three hours and was then allowed to stand overnight. The crystals were separated by centrifuging, washed twice with glacial acetic acid and twice with ether, then filtered. The resulting nearly white product weighed 17.7 g. after drying in a vacuum desiccator. This material, probably consisting in part of the dihydrobromide, melted over the range 157–165°. Recrystallization from a mixture of acetone and ether gave the mono-hydrobromide; M. P. 167–169°: Anal. Calcd. for: $C_9H_4N_3Br \cdot HBr$: C, 33.23; H, 4.65; N, 12.93. Found: C, 33.52; H, 4.65; N, 13.13.

*Preparation of 4-methyl-5-β-hydroxyethyl-N-{[2 - n - butyl - 4 - amino - pyrimidyl - (5)] - methyl}-thiazolium bromide hydrobromide*

To 28 ml. of light petrolatum, heated to 110°, 7 g. of crude 2-butyl-4-amino-5-bromomethyl-pyrimidine hydrobromide and 5.6 g. of 4-methyl-5-β-hydroxyethyl-thiazole were added simultaneously with rapid stirring. The product quickly precipitated in a solid mass. The mixture was cooled, the oil was decanted, and the residue was triturated with ether, collected on a filter, and washed with additional ether. A single crystallization from absolute alcohol gave white plates of 4-methyl-5-β-hydroxyethyl-N-{[2-n-butyl-4-amino-pyrimidyl-(5)]-methyl}-thiazolium bromide hydrobromide, M. P. 229–230° (capillary) with decomposition. A second crop of 1.0 g. (M. P. 225–6°) was obtained by dilution of the mother liquor with ether. An analytical sample, crystallized a second time from absolute alcohol, melted at 229–230° C. Anal: Calcd. for $C_{15}H_{24}N_4OSBr_2$. C, 38.45; H, 5.17; N, 11.97. Found: C, 38.63; H, 5.46; N, 11.87.

This compound can be converted to the chloride hydrochloride by dissolving in hot methanol and stirring with slightly more than two molecular equivalents of silver chloride The precipitate containing silver bromide and excess unreacted silver chloride is removed by filtration and the 4 - methyl - 5 - β - hydroxyethyl - N - {[2 - n - butyl - 4 - amino - pyrimidyl - (5)] - methyl} - thiazolium chloride hydrochloride product is precipitated from the methanolic filtrate by addition of ether.

Modifications may be made in carrying out the present invention without departing from the spirit and scope thereof, and the invention is to be limited only by the appended claims.

We claim:

1. A compound selected from the class which consists of 4-methyl-5-β-hydroxyethyl-N-{[2-n-butyl - 4 - amino - pyrimidyl - (5)] - methyl} - thiazolium halides and hydrogen halide salts thereof.

2. 4 - methyl - 5 - β - hydroxyethyl - N - {[2 - n - butyl - 4 - amino - pyrimidyl - (5)] - methyl} - thiazolium monohalide.

3. 4 - methyl - 5 - β - hydroxyethyl - N - {[2 - n - butyl - 4 - amino - pyrimidyl - (5)] - methyl} - thiazolium halide hydrohalide.

4. 4 - methyl - 5 - β - hydroxyethyl - N - {[2 - n - butyl - 4 - amino - pyrimidyl - (5)] - methyl} - thiazolium bromide hydrobromide.

5. 4 - methyl - 5 - β - hydroxyethyl - N - {[2 - n - butyl - 4 - amino - pyrimidyl - (5)] - methyl} - thiazolium chloride hydrochloride.

RANDOLPH T. MAJOR.
KARL FOLKERS.
OSCAR H. JOHNSON.
PHILIP L. SOUTHWICK.

REFERENCES CITED

The following references are of record in the file of this patent:

Schultz, Zeit fur Physiol. Chem. 265, 113 (1940).